US010528606B2

(12) United States Patent
Lei

(10) Patent No.: US 10,528,606 B2
(45) Date of Patent: Jan. 7, 2020

(54) METHOD FOR PROVIDING SEARCH SUGGESTION CANDIDATES FOR INPUT KEY AND METHOD FOR CREATING DATABASE DFA

(71) Applicant: Qijian Software (Beijing) Co., Ltd., Beijing (CN)

(72) Inventor: Peng Lei, Beijing (CN)

(73) Assignee: BEIJING QIJIAN CLOUD TECH CO., LTD, Beijing (CN)

( * ) Notice: Subject to any disclaimer, the term of this patent is extended or adjusted under 35 U.S.C. 154(b) by 413 days.

(21) Appl. No.: 15/444,267

(22) Filed: Feb. 27, 2017

(65) Prior Publication Data

US 2017/0255692 A1    Sep. 7, 2017

Related U.S. Application Data

(60) Provisional application No. 62/345,004, filed on Jun. 3, 2016.

(30) Foreign Application Priority Data

Mar. 3, 2016    (CN) .......................... 2016 1 0119044

(51) Int. Cl.
*G06F 16/30*    (2019.01)
*G06F 16/33*    (2019.01)
(Continued)

(52) U.S. Cl.
CPC ...... *G06F 16/3337* (2019.01); *G06F 16/3323* (2019.01); *G06F 17/2836* (2013.01);
(Continued)

(58) Field of Classification Search
None
See application file for complete search history.

(56) References Cited

U.S. PATENT DOCUMENTS

| 7,260,558 B1* | 8/2007 | Cheng | G06F 16/90344 |
| | | | 706/12 |
| 2010/0231523 A1* | 9/2010 | Chou | G06F 3/018 |
| | | | 345/171 |

(Continued)

OTHER PUBLICATIONS

Wu Yang et al., A Dictionary Mechanism for Chinese Word Segmentation Based on Finite Automata, 2010 [retrieved on Jun. 10, 2019], 2010 International Conference on Asian Language Processing. Retrieved from the Internet: https://ieeexplore.ieee.org/document/5681563. (Year: 2010).*

*Primary Examiner* — Kristopher Andersen
(74) *Attorney, Agent, or Firm* — Jun He Law Offices P.C.; James J. Zhu

(57) ABSTRACT

A method for providing one or more search suggestion candidates for an input key comprises: (1) acquiring characteristic information of the input key; (2) creating a characteristic DFA (Deterministic Finite Automaton) of the input key based on the characteristic information of the input key; (3) searching the characteristic DFA of the input key in a predetermined database DFA having a plurality of bridge transitions each linking a bridge head state with a bridge tail state, so as to identify a bridge head state that matches the characteristic DFA of the input key, wherein each bridge head state of the predetermined database DFA corresponds to a final state of a characteristic DFA of a target candidate which is created based on characteristic information of the target candidate; and (4) outputting one or more target candidates corresponding to a bridge tail state linked with the identified bridge head state as the search suggestion candidate for the input key.

23 Claims, 6 Drawing Sheets

(51) Int. Cl.
  *G06F 16/332*  (2019.01)
  *G06F 17/28*   (2006.01)
  *G06N 3/00*    (2006.01)
  *G10L 15/02*   (2006.01)
  *G10L 15/26*   (2006.01)

(52) U.S. Cl.
  CPC ......... *G06F 17/2863* (2013.01); *G06N 3/004* (2013.01); *G10L 15/02* (2013.01); *G10L 15/265* (2013.01)

(56) References Cited

U.S. PATENT DOCUMENTS

2014/0372105 A1* 12/2014 Manadhata ......... G06F 17/2775
  704/9
2015/0325240 A1* 11/2015 Li ..................... G06K 9/00335
  704/231

* cited by examiner

METHOD FOR PROVIDING SEARCH SUGGESTION CANDIDATES FOR INPUT KEY AND METHOD FOR CREATING DATABASE DFA

CROSS REFERENCE TO RELATED APPLICATIONS

This application claims priority to Chinese Patent Application No. 201610119044.5 filed on Mar. 3, 2016 and U.S. Patent Application No. 62/345,004 filed on Jun. 3, 2016, the entire content of which are incorporated herein by reference.

TECHNICAL FIELD

The present application relates to computer technology, and more particularly, to a method and apparatus for providing search suggestion candidates for an input search key, and a method and apparatus for creating a database DFA (Deterministic Finite Automaton).

BACKGROUND

Certain methods for providing search candidates have been developed and applied extensively in various fields, such as Chinese text input, search engine, artificial intelligence (AI) and machine translation. Taking the Chinese text input as an example, the pinyin input method is a popular type of Chinese text input method nowadays. However, the existence of polyphone characters and homophone characters in Chinese leads to text input errors when using the pinyin input methods. The term "polyphone character" refers to a Chinese character having multiple pinyins, and the term "homophone characters" refers to two or more Chinese characters having a common pinyin. For example, the same pinyin string "ging hua da xue" corresponds to different Chinese characters "清华大学" or "清华大学", pinyin string "you hui Juan" corresponds to "优惠券" or "优惠券", and the user has to select the desired Chinese characters out of all possible combinations. Moreover, since Chinese has so many dialects other than Mandarin, one Chinese character may correspond to different pronunciations. Accordingly, it is common that a user mis-pronounces a Chinese character and thus inputs a wrong pinyin string. For example, when a user tries to get a string of Chinese characters "传记", he or she may input the wrong pinyin string "chuanji" instead of "zhuanji", which leads to a wrong Chinese character string such as "穿记".

With the increasing requirement on the accuracy and speed of text input methods, the current candidate searching methods need further improvements. For example, the current Chinese text input methods cannot efficiently process and rectify the Chinese input errors caused by the existence of polyphone characters, homophone characters, or wrongly written or mispronounced characters. Thus, there is a need for a method capable of rectifying such input errors in an efficient manner.

SUMMARY

An objective of the present application is to provide a method, apparatus and computer program product for providing search suggestion candidates for an input key, and a method, apparatus and computer program product for creating a database DFA, so as to improve the efficiency of candidate searching and reduce the memory usage by candidate searching.

To address at least one of the above objectives, in a first aspect of the present application, there is disclosed a method for providing one or more search suggestion candidates for an input key. The method comprises: (1) acquiring characteristic information of the input key; (2) creating a characteristic DFA (Deterministic Finite Automaton) of the input key based on the characteristic information of the input key, wherein said characteristic information is obtained from a predefined characteristic information database; (3) searching the characteristic DFA of the input key in a predetermined database DFA having a plurality of bridge transitions each linking a bridge head state with a bridge tail state, so as to identify a bridge head state that matches the characteristic DFA of the input key, wherein each bridge transition's source state is called the bridge head state, and each bridge transition's target state is called the bridge tail state, and wherein each bridge head state of the predetermined database DFA corresponds to a final state of a characteristic DFA of a target candidate created based on characteristic information of the target candidate; and (4) outputting a target candidate corresponding to a bridge tail state linked with the identified bridge head state as the search suggestion candidate for the input key, wherein the bridge tail state is simply obtained from the bridge head state which is obtained in the previous step (3) on the bridge transition.

In another aspect of the present application, there is disclosed a method for creating a database DFA. The database DFA has a plurality of bridge transitions each linking a bridge head state and a bridge tail state. The method comprises: (A) acquiring a target candidate; (B) acquiring characteristic information of the target candidate; (C) creating a characteristic DFA of the target candidate based on the characteristic information of the target candidate; (D) linking a final state of the characteristic DFA of the target candidate with the target candidate using a bridge transition; and (E) adding the linked target candidate and its characteristic DFA into the database DFA, such that the final state of the characteristic DFA is corresponding to a bridge head state of the database DFA.

In certain other aspects of the present application, there are also disclosed an apparatus and computer program product for providing one or more search suggestion candidates for an input key, and an apparatus and computer program product for creating a database DFA.

For the method and apparatus of the present application, by converting an input key into a DFA, various changes of characteristic information of the input key can be encompassed by the DFA, so as to make the searching process highly efficient. Furthermore, the predetermined database DFA uses little system storage and processing resources, which further improves the processing speed and efficiency of the candidate searching.

The methods for providing search suggestion candidates and the database DFA using the methods of the present application can be applied in various fields, such as input error correction, Chinese text input, language translation, voice recognition, and optimization of decision tree algorithm in AI.

The present application uses DFA to resolve the problems in candidate searching for input keys. By creating a database DFA offline and applying DFA intersection operations online, the speed, efficiency and accuracy of the candidate searching can be significantly improved.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

Figure 1:
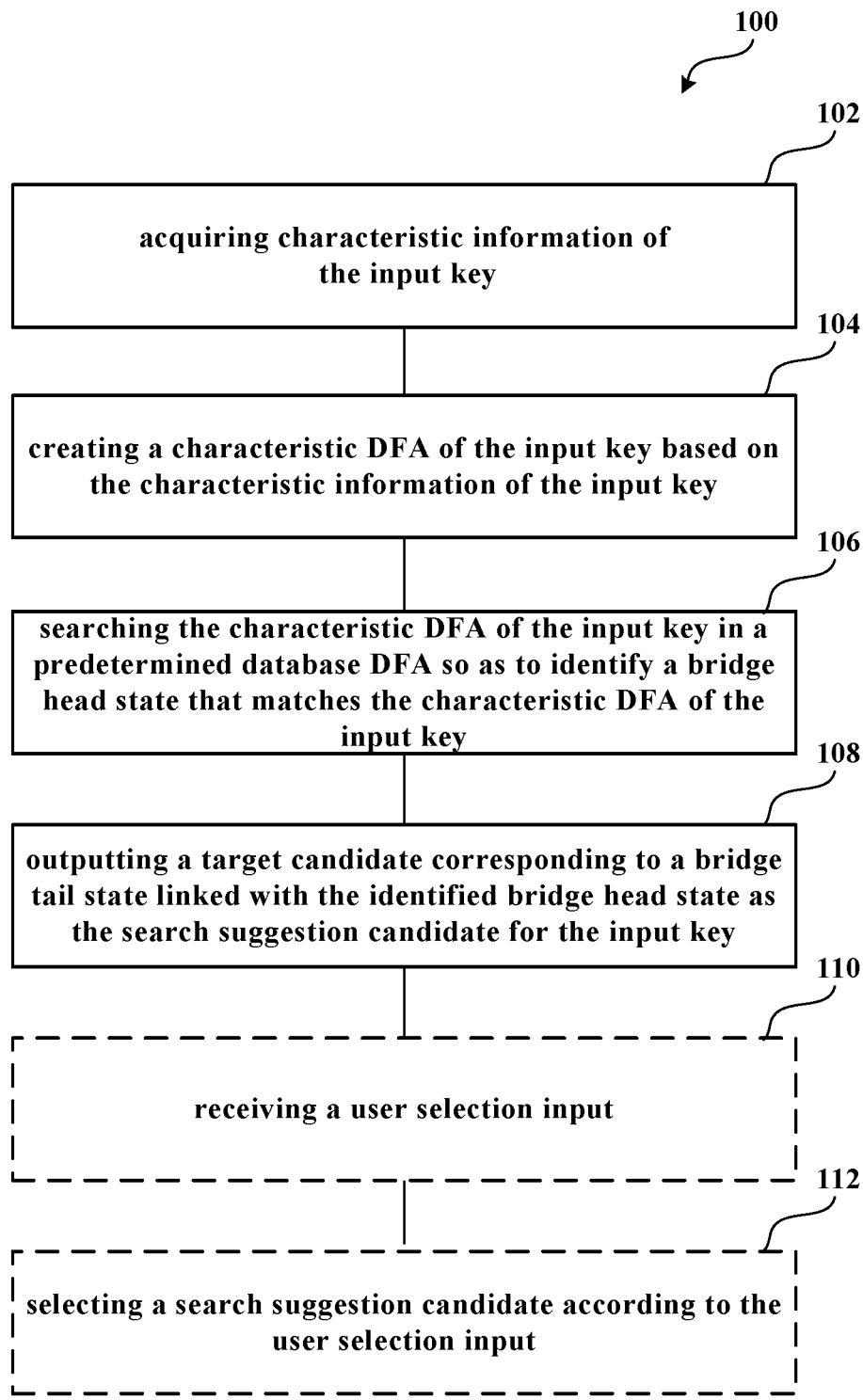
FIG. 1 is a flow chart of a method 100 for providing search suggestion candidates for an input key according to an embodiment of the present application.

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the present application. It should be understood that, the various aspects of the present application described and graphically presented herein may be arranged, replaced, combined, divided and designed in many different configurations, and these different configurations are implicitly included in the present application.

The existence of polyphone characters and homophone characters in Chinese often leads to too many possible combinations of Chinese characters. To require a user to select the desired one out of all candidates becomes a burden for the user. Moreover, since Chinese has so many dialects other than Mandarin, one Chinese character may correspond to different pronunciations. Thus, it is common that a user inputs a wrong pinyin string. Accordingly, it is desirable to provide a solution for addressing pinyin input errors or narrowing down possible Chinese character combination candidates.

For example, a user has input a Chinese text string "柙脯柙脯优惠卷" with typoes. The Chinese characters of the text string have respective pinyins as below, where the characters "柙", "脯" and "卷" are polyphones. The character "卷" is a wrong Chinese character, as it looks quite similar to the right Chinese character "券".

TABLE 1

| Chinese character | | | | | | |
|---|---|---|---|---|---|---|
| 柙 | 脯 | 柙 | 脯 | 优 | 惠 | 卷 |
| Pinyin 1  jia | fu | jia | fu | you | hui | gun |
| Pinyin 2  xia | pu | xia | pu | | | juan |
| Pinyin 3 | | | | | | jun |
| Pinyin 4 | | | | | | quan |

The correct text string should be "呷哺呷哺优惠券", which refers to a coupon (优惠 券) of a popular hotpot restaurant (呷哺呷哺), and the Chinese characters of the text string have respective pinyins as below, where the characters "呷", "哺" and "券" are polyphones.

TABLE 2

| Chinese character | | | | | | |
|---|---|---|---|---|---|---|
| 呷 | 哺 | 呷 | 哺 | 优 | 惠 | 券 |
| Pinyin 1  jia | fu | jia | fu | you | hui | quan |
| Pinyin 2  xia | bu | xia | bu | | | xuan |
| Pinyin 3  ga | | ga | | | | |

As can be seen that the above two text strings both include two pinyin sequences, i.e. ((jia)(fu)(jia)(fu)(you)(hui)(quan) or (xia)(fu)(xia)(fu)(you)(hui)(quan)). Thus, based on the two common pinyin sequences, the text strings "柙脯柙脯优惠卷" and "呷哺呷哺优惠" can be associated with each other. Thus, the incorrect text string "柙脯柙脯优惠卷" may be replaced by the text string "呷哺呷哺优惠券" to rectify the input error.

In the prior art, in order to achieve the above Chinese input error correction, it is required to convert the Chinese text string into a sequence of pinyins, and then replace the incorrect Chinese text string by a correct text string that shares a common pinyin sequence or combination with the incorrect Chinese text string. However, when the text string to be corrected includes many polyphone characters or wrongly written or mispronounced characters, it is required to convert the polyphone characters or wrongly written or mispronounced characters into multiple corresponding pinyins, which significantly increases the number of the pinyin combinations. As shown in Table 1, the text string "呷哺呷哺优惠 券" corresponds to 72 pinyin combinations, and the text string "柙脯柙脯优惠卷" corresponds to 64 pinyin combinations. If the pinyins of the pinyin combinations can be further represented by their respective initial characters, the number of the pinyin combinations may double or increase even more. The increase of the pinyin combinations may adversely affect the input error correction. Especially in a scenario where a server needs to process a huge amount of user inputs, the increase of the pinyin combinations may result in that the server cannot provide desirable search candidates, as well as increasing the cost in servers.

The inventor of the present application has observed that a regular expression can describe the logic relationship between characters or character strings using operators, and that the Chinese text strings are combinations of Chinese characters in a definite order, or particularly in a linear order. Thus, the description of the pinyin combinations or English language character combinations corresponding to the Chinese text strings can be significantly simplified using Regular expressions.

For example, from Table 1, the incorrect Chinese text string " 柳脯柳脯优惠卷 " corresponds to Regular Expression (1) as below.

$$(xia|jia)(fu|pu)(xia|jia)(fu|pu)(you)(hui)(gun|juan|jun|quan) \quad (1)$$

Further, from Table 2, the correct Chinese text string " 呷哺呷哺优惠券 " corresponds to Regular Expression (2) as below.

$$(ga|xia|jia)(bu|pu)(ga|xia|jia)(bu|pu)(you)(hui)(quan|xuan) \quad (2)$$

The pinyin combinations described by the two regular expressions have an intersection in common (i.e. match with each other), which indicates that the known correct Chinese text string " 呷哺呷哺优惠券 " can be used as a suggestion candidate for the incorrect Chinese text string " 柳脯柳脯优惠卷 ". It will be appreciated that, in certain cases, the incorrect Chinese text string " 柳脯柳脯优惠卷 " may correspond to multiple Chinese text strings. Alternatively, if desired, all the possible Chinese text strings obtained in this way may be provided to the user as a suggestion candidate list from which the user may select a desired candidate.

Generally, the regular expression is a sequence of characters that define certain sets of strings in accordance with a specific rule. The regular expression includes constants that denote one or more sets of strings, and operators that denote operations over these sets of strings. In order for computer processing, the regular expression can be converted into an equivalent DFA (Deterministic Finite Automaton) which can be processed by a computer system.

Based on the above observations, it is also desired to provide a method for creating a database DFA, and a method for providing search suggestion candidates for an input key using the created database DFA. With the above methods, input errors of Chinese text strings can be rectified efficiently and quickly, using little resources (CPU, memory, etc.) of a computer system.

In practice, the present application can be used in many other fields, such as input error correction, language translation, voice recognition, and optimization of decision tree algorithm in AI. In the following paragraphs, the method and apparatus of the present application are exemplarily described with reference to the example where the input errors of Chinese text strings are rectified. However, such description is exemplary and not a limitation to the present application.

It will be readily appreciated that, in certain embodiments, the database DFA may be deployed within a user terminal, such as a mobile phone, a tablet computer, a personal computer (PC) or any other smart devices. Accordingly, the method for providing search suggestion candidates for an input key is implemented on the user device. In some other embodiments, the database DFA may be deployed within a remote processing device such as a server. Accordingly, the input key may be transmitted from a user terminal to the remote processing device, and the method for providing search suggestion candidates can be implemented on the remote processing device.

FIG. 1 shows a method 100 for providing search suggestion candidates for an input key according to an embodiment of the present application. In the embodiment in FIG. 1, the method 100 is used for input error correction for Chinese text strings, i.e. the input key is a string of Chinese characters used as a search keyword. It will be appreciated that, in certain other applications, the input key may also be a string of pinyin (Chinese pinyin), a string of foreign language corresponding words (e.g. English words), a voice input, or any other sequence of data items.

As shown in FIG. 1, in step 102, characteristic information of the input key is acquired.

Specifically, the input key is a string of Chinese characters, which may be a search keyword inputted by a user using a search application. For example, the search keywords may be a text string consisting substantially of Chinese characters, which may further include other types of characters such as numerical characters, pinyin characters or foreign characters. In step 102, only the Chinese characters of the text string are processed, or alternatively, both the Chinese characters and the non-Chinese characters of the text string, including the numerical characters, pinyin characters or foreign characters, may be processed.

For example, in step 102, the search keyword may be " 柳脯柳脯 youhuiquan" which includes Chinese characters " 柳脯柳脯 " and pinyin characters "youhuiquan". In certain examples, when searching for search suggestion candidates for the search keyword " 柳脯柳脯 youhuiquan", only the Chinese characters " 柳脯柳脯 " is processed. However, in certain alternative examples, both the Chinese characters " 柳脯柳脯 " and the pinyin characters "youhuiquan" are processed. Preferably, the characteristic information of both the Chinese characters " 柳脯柳脯 " and the pinyin characters "youhuiquan" may be acquired for subsequent processing. For example, the pinyins corresponding to " 柳脯柳脯 " may be acquired, and the pinyins "you", "hui" and "quan" included in the pinyin characters "youhuiquan" may be extracted therefrom in accordance with Chinese pinyin standard.

In some alternative embodiments, the characteristic information of the string of Chinese characters may be the respective pinyins, foreign language corresponding words or stem components. Each Chinese character in the string may correspond to one or more pinyins, or two or more consecutive Chinese characters in the string may correspond to one or more foreign corresponding words. It should be noted that, the characteristic information of the Chinese characters may be in accordance with a general dictionary definition or standard grammar, or may alternatively be predefined based on common errors or obvious errors. For example, the pinyins of the respective Chinese characters of the string " 柳脯柳脯 " as shown in Table 1 are all included in a polyphone dictionary. Moreover, a correspondence " 优惠券 —coupon" is generally included in a Chinese-English dictionary. Thus, the three consecutive characters " 优惠券 " may correspond to an English word "coupon", because " 优惠券 " is an obvious equivalent (although the last Chinese character " 卷 " is wrong) for Chinese characters " 优惠券 ". For purpose of error correction, it is desired to associate the characters " 优惠券 " with the English word "coupon".

It should be noted that, the term "pinyin" used herein includes both the full pinyin and the initial characters of the full pinyin. For example, the full pinyin of the Chinese character "栅" may be "xia" or "jia" from Table 1, and thus the pinyin corresponding to "栅" may include "xia", "jia", "x" and "j". In some examples, the pinyin of a Chinese character may further include a mispronounced pinyin for the Chinese character. For example, the correct pinyin of Chinese character "女" is "nv", which may be mispronounced as "lv". Thus, the pinyin corresponding to the Chinese character "女" may include "nv" and "lv".

In certain examples, the characteristic information of the search keywords may also be extracted stem component of the respective Chinese characters of the search keywords. For example, the stem component of Chinese character "栅" of "栅脯栅脯" may be "甲", and the stem component of Chinese character "脯" may be "甫".

In certain embodiments, the characteristic information of the input key may be determined based on a predefined characteristic information database. Specifically, the characteristic information database may include a Chinese dictionary, a dictionary including wrongly spelled/written or mispronounced characters, a Chinese-foreign language dictionary and other similar dictionaries or databases. The characteristic information database may be created in advance, and the characteristic information stored within such database may be added, modified or deleted according to different applications. For example, for purpose of error correction, all the possible pinyins of a Chinese character may be included in the characteristic information database. Specifically, the characteristic information database may have multiple data items, each of which is associated with respective characteristic information, and the data category of the data items is the same as that of the input key. For example, the Chinese dictionary may include Chinese characters and their respective pinyins; the Chinese-Foreign language dictionary may include Chinese words and their respective foreign language words, such as English words. For all the data items of the input key, they can be searched in the characteristic information database to acquire the corresponding characteristic information.

Next, in step 104, a DFA of the input key is created based on the characteristic information of the input key.

Figure 2A:
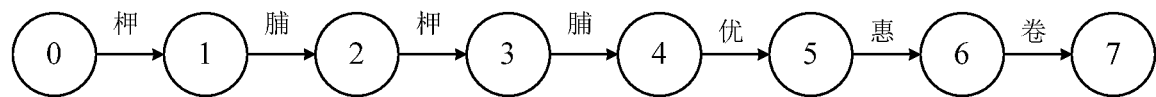
FIGS. 2a, 2b and 2c show examples that an input key is converted into corresponding characteristic DFAs.
Figure 2B:
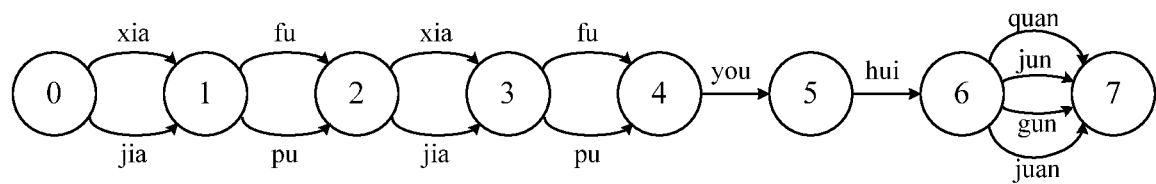

FIGS. 2a and 2b show an example that an input key is converted into a corresponding characteristic DFA.

As shown in FIG. 2a, the input key "栅脯栅脯优惠卷" is a string of Chinese characters, which includes Chinese characters "栅", "脯", "栅", "脯", "优", "惠" and "卷" in a sequential order. Accordingly, when described in DFA form, the input key may be represented by a linear DFA having eight states, and each Chinese character is an input symbol or input character that allows a transition from one state to another state of the DFA.

Based on the pinyins of the input key "栅脯栅脯优惠卷" shown in Table 1, the input key "栅脯栅脯优惠卷" can be converted into a corresponding characteristic DFA. FIG. 2b shows an NFA (Non-deterministic Finite Automaton) corresponding to the characteristic DFA, which can be expressed by Regular Expression (1). The NFA will be converted to its equivalent DFA later.

In practice, one or more characteristic sub-DFAs for respective data items of the input key may be created based on the characteristic information of the data items of the input key. For example, as a Chinese pinyin generally includes a string of pinyin characters, each pinyin corresponds to a sub-DFA. For example, the characteristic sub-DFA of Chinese character "栅" may be created based on the corresponding pinyins "jia" and "xia", which can be expressed by a regular expression (xia|jia). All the created characteristic sub-DFAs may then be linked together (by ε-transitions, for example), so as to obtain an NFA. The NFA is a characteristic NFA corresponding to the input key. After that, the characteristic NFA can be converted into the equivalent characteristic DFA of the input key. The NFA-to-DFA conversion can be implemented using an existing algorithm (e.g. power set construction), which is not elaborated herein.

Figure 2C:
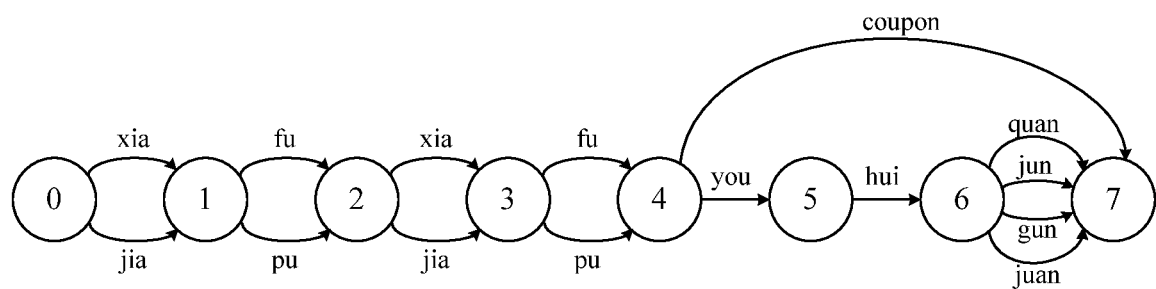

FIG. 2c shows another exemplary characteristic DFA of the input key in FIG. 2a.

Different from the DFA shown in FIG. 2b, the characteristic DFA shown in FIG. 2c further includes an English word "coupon" corresponding to the Chinese text string "优惠券", which is in parallel with a pinyin regular expression (you)(hui)(gun|juan|jun|quan) corresponding to the Chinese text string "优惠券". Accordingly, the characteristic NFA shown in FIG. 2c can be expressed by Regular Expression (3) below:

$$(xia|jia)(fu|pu)(xia|jia)(fu|pu)(((you)(hui)(gun|juan|jun|quan))|(coupon)) \qquad (3)$$

It will be appreciated that each characteristic DFA is a specific DFA with multiple states, which can transit between such states based on respective input symbol(s). Each characteristic DFA may have one or more final states on which one or more strings of specific characters or symbols have been accepted. For example, a final state of the characteristic NFA shown in FIG. 2b may be a state on which a string of characters (jia)(fu)(jia)(fu)(you)(hui)(quan) or a string of characters (xia)(fu)(xia)(fu)(you)(hui)(quan) have been accepted.

After the characteristic DFA of the input key is created, in step 106, the characteristic DFA of the input key is searched in a predetermined database DFA, which has a plurality of bridge head states, to identify one or more states that match the characteristic DFA of the input key. Specifically, each bridge head state of the predetermined database DFA corresponds to a final state of a characteristic DFA of a target candidate created based on the characteristic information of the target candidate, and the target candidate itself corresponds to a bridge tail state which is linked with the bridge head state by a bridge transition. Thus, the predetermined database DFA has a plurality of bridge transitions. An identified bridge head state matches a final state of the characteristic DFA of the input key.

The predetermined database DFA has a plurality of target candidates each linked with a respective characteristic DFA. In some examples, the target candidate and the input key may be of the same data category. For input error correction application for Chinese characters, the target candidate may be a string of Chinese characters, which is the same as the data category of the input key. For example, the input key may be Chinese characters "栅脯栅脯优惠卷" or texts of similar pinyins, and the target candidate may be Chinese characters "呷哺呷哺优惠券".

It will be appreciated that, depending on the specific applications, the target candidate may have a data category different from that of the input key. For example, for a Chinese text input method, the input key may be a string of pinyin characters (with or without separators between the pinyin characters), and characteristic information of the string of pinyin characters may include characteristic pinyin information. For example, the input key may be a string of pinyin characters "xiabuxiabuyouhuiquan", while the target candidate may be a string of Chinese characters "呷哺呷哺优惠券". It can be appreciated that the target candidates of the predetermined database DFA may be represented by identifications of such target candidates, e.g.

respective identifiers or identification codes for uniquely identifying such target candidates. With such identifications, the target candidates can be uniquely determined, for example, through a target candidate database indexed with the identifications. It can be understood that the target candidates are desired targets that are determined in advance.

As mentioned above, each target candidate has a corresponding characteristic DFA, which is created based on the characteristic information of the target candidate. In some examples, the creation of the characteristic DFA of the target candidate is the same as or similar to the creation of the characteristic DFA of the input key. For example, the characteristic DFA of the string of Chinese characters "呷哺呷哺优惠券" may be expressed by Regular Expression (2). Thus, the creation of the characteristic DFA of the target candidate will not be elaborated herein.

Each characteristic DFA of the target candidate has one or more final states, each of which corresponds to a bridge head state of the predetermined database DFA. In some examples, each target candidate in the predetermined database DFA is linked with the one or more final states of the target candidate's respective characteristic DFA by bridge transition(s), so as to link the characteristic DFA with the target candidate. It can be appreciated that each target candidate (e.g. a string of Chinese characters) may be regarded as a linear DFA that can be stored in the database DFA as a sub DFA. The linear DFA of the target candidate may include multiple states, and transitions between such states may depend on the data items included in the target candidate. The bridge transition leads the final state of the characteristic DFA of the target candidate to the initial state of the target candidate in DFA form which corresponds to a bridge tail state. In this way, matching strings of characters (or applying DFA intersection) on the database DFA may reach some bridge head states, the target candidate can be obtained by performing subsequent state transitions starting from the corresponding bridge tail states. In some examples, two or more target candidates may correspond to the same bridge tail state.

For example, the string of Chinese characters "呷哺呷哺优惠券" and the corresponding DFA (expressed by Regular Expression (2)) linked by a bridge transition may be expressed by Regular Expression (4) below:

(ga|xia|jia)(bu|pu)(ga|xia|jia)(bu|pu)(you)(hui)
(quan|xuan)\t 呷哺呷哺优惠券     (4)

where the bridge transition (with label of) "\t" links the characteristic DFA with the target candidate. In practice, the (label of) bridge transitions may be a character (byte) that is not any of the characteristic information. For example, the (label of) bridge transition may be other characters such as "\n", "#" or "$". When linked with the characteristic DFA, the string of characters of the input key is treated as a linear DFA. Preferably, the final state of the characteristic DFA is prior to the initial state of target candidate in DFA form, as shown in Regular Expression (4). The characteristic DFA and the target candidate linked by the bridge transition is also a DFA.

It can be seen that, if the characteristic DFA of the input key has a same path as that of the characteristic DFA of the target candidate, for example, the DFA expressed by Regular Expression (4) and the characteristic DFA of the input "柳脯柳脯优惠卷" both have a sequence (jia)(fu)(jia)(fu)(you)(hui)(quan) or (xia)(fu)(xia)(fu)(you)(hui)(quan), then it can be determined that the final state of the characteristic DFA of the target candidate matches the final state of the characteristic DFA of the input key. In this way, the target candidate "呷哺 呷哺优惠券" is a search suggestion candidate that matches the input key "柳脯柳脯优惠卷".

In some embodiments, step 106 may be implemented by applying a DFA intersection operation using the characteristic DFA of the input key and the predetermined database DFA. Based on the result of the DFA intersection operation, one or more search suggestion candidates can be identified.

The intersection operation between the characteristic DFA and the database DFA is an intersection operation that intersects the respective state transition sets of the two DFAs using corresponding input symbols to determine the corresponding states. Specifically, the intersection operation may be implemented as follows. First, the initial state (s0) of the characteristic DFA is paired with the initial state (d0) of the database DFA (the database DFA is a large-scale DFA). After that, all the input symbol of the initial state (s0) of the characteristic DFA is compared with all the input symbols of the initial state (d0) of the database DFA which is paired to the initial state s0. If there exists at least one input symbol of the state s0 that is the same as the respective input symbol of the state d0, then a state (s1) next to the state s0 whose transition is caused by the input symbol is compared with a state (d1) next to the state d0 whose transition is caused by the same input symbol. Similarly, all the input symbols of the state s1 of the characteristic DFA is compared with all the input symbols of the state d1 of the database DFA, so as to obtain another pair of states, i.e. a state (s2) of the characteristic DFA next to the state s1 and a state of the database DFA next to the state d1. After several times of comparison, a final state (st) of the characteristic DFA may be paired with a state (dt) of the database DFA, which may be determined as a state that matches the final state (st). If the state (dt) has a bridge transition (whose label is '\t'), the bridge tail state is determined as the initial state of the target candidate.

Next, in step 108, one or more target candidates corresponding to a bridge tail state linked with the identified bridge head state are outputted, as search suggestion candidates for the input key.

For example, the string of characters "呷哺呷哺优惠券" may be outputted as the search suggestion candidate for the input key "柳脯柳脯优惠卷". It can be appreciated that, in practice, if multiple bridge head states have been identified for an input key, then all of the target candidates corresponding to the respective bridge tail states linked with these bridge tail states can be outputted (there may be duplications in the output, and such duplications can be eliminated). A user may select a desired target candidate from the outputted target candidates.

In some optional embodiments, step 110 of receiving a user selection input and step 112 of selecting a search suggestion candidate according to the user selection input can be included after step 108.

Figure 3:
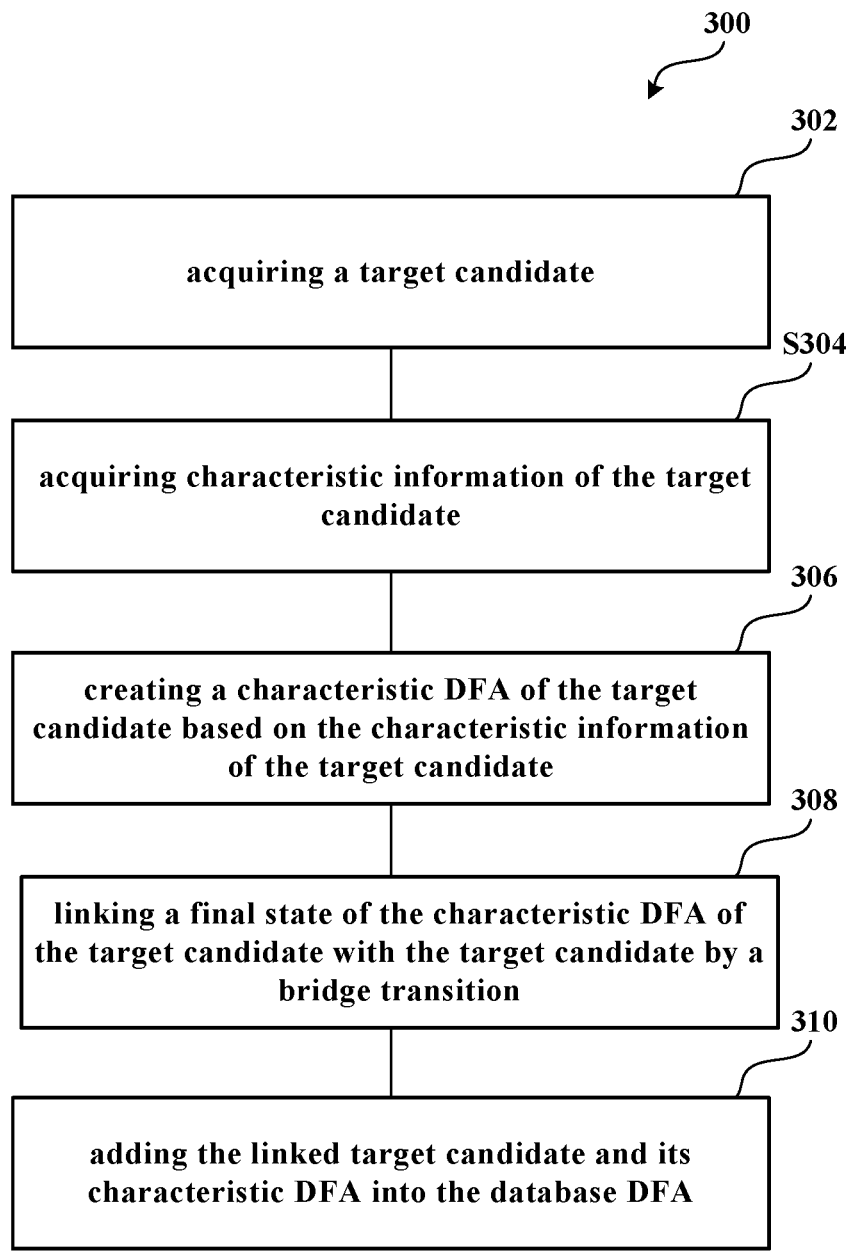
FIG. 3 is a flow chart of a method 300 for creating a database DFA according to an embodiment of the present application.

FIG. 3 shows a method 300 for creating a database DFA according to an embodiment of the present application. The database DFA created by the method 300 may be used in the process for providing search suggestion candidates for an input key, as shown in step 106 of FIG. 1. The database DFA has a plurality of bridge transitions and a plurality of bridge head states, and each bridge head state can be used for comparison with a final state of a DFA external to the database DFA. Each bridge transition links a bridge head state with a bridge tail state. Furthermore, each bridge head state of the database DFA corresponds to a final state of a characteristic DFA of a target candidate. It can be appreciated that adding bridge transitions into the database DFA is the same as adding normal transitions. People skilled in the art can readily appreciate that creating a database DFA can be implemented by repeating a portion or all of the following steps.

As shown in FIG. 3, in step 302, a target candidate is acquired.

Specifically, the data category of the target candidate varies with the specific application of the database DFA. In some examples, the database DFA is used for user-input error correction, and the target candidate may be search keywords such as a string of Chinese characters. In some other examples, the database DFA is used for Chinese text input methods, and the target candidate may be Chinese characters. In some further examples, the database DFA is used for voice recognition, and the target candidate may be text such as a string of Chinese or English characters.

Next, in step 304, characteristic information of the target candidate is acquired.

In order to create a database DFA, the characteristic information of the target candidate should be predefined, and the predefinitions are fully customizable for different applications, which can be obtained from a predefined characteristic information database. In some examples, the database DFA is used for user-input error correction, and accordingly, the target candidate includes a string of Chinese characters and the characteristic information of the target candidate includes pinyins, foreign language corresponding words or stem components of the Chinese characters. In some other embodiments, the database DFA is used for Chinese text input method, and accordingly, the target candidate includes Chinese characters and the characteristic information of the target candidate includes characteristic pinyin information. In some other embodiments, the database DFA is used for language translation, and accordingly, the input key is of a first language and the target candidate includes a text string of a second language. In some other embodiments, the database DFA is used for voice recognition, and accordingly, the target candidate includes text, and the characteristic information of the target candidate includes vocal characteristic of the text, e.g. the Chinese pinyin or the English phonetic symbol.

Furthermore, as described with reference to the embodiment shown in FIG. 1, the characteristic information of the input key can be determined based on the predefined characteristic information database. Similarly, the characteristic information of all data items of the target candidate can be determined based on the predefined characteristic information database. The predefined characteristic information database may be a standard Chinese dictionary, a supplemental dictionary including commonly wrongly spelled/written or mispronounced characters, a Chinese-foreign language dictionary and other similar dictionaries or databases.

Next, in step 306, a characteristic DFA of the target candidate is created based on the characteristic information of the target candidate.

Figure 4A:
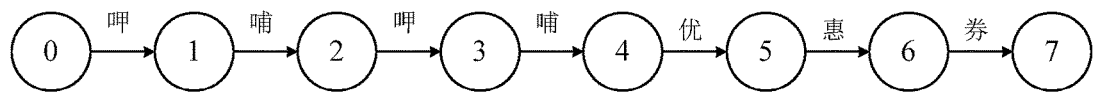
FIGS. 4a and 4b show an example that a target candidate is converted to a corresponding characteristic DFA.
Figure 4B:
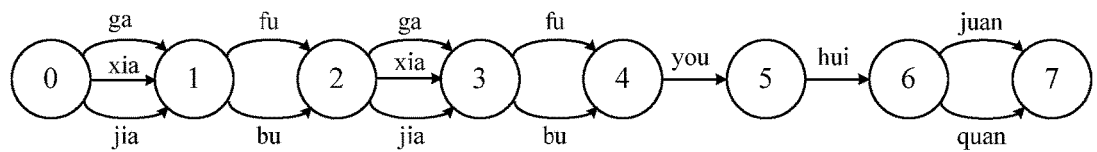

FIGS. 4a and 4b show an example that a target candidate is converted into a corresponding characteristic DFA.

As shown in FIG. 4a, the target candidate "呼哺呼哺优惠券" is a string of Chinese characters, which includes Chinese characters "呼", "哺", "呼", "哺", "优", "惠", "券". When described in DFA form, the target candidate may be represented by a linear DFA having eight states, and each Chinese character is an input symbol or input character that allows a transition from one state to another state of the DFA according to the sequence of the Chinese characters in the target candidate.

Based on the pinyins of the target candidate "呼哺呼哺优惠券" shown in Table 2, the target candidate "呼哺呼哺优惠券" can be converted into a corresponding characteristic NFA shown in FIG. 4b, which can be expressed by Regular Expression (2). Furthermore, the characteristic NFA can be converted into a corresponding characteristic DFA.

Next, in step 308, the final state of the created characteristic DFA of the target candidate is linked with the target candidate by a bridge transition.

Specifically, the target candidate and the corresponding characteristic DFA can be linked by a bridge transition, so as to link the final state of the characteristic DFA of the target candidate with the initial state of the target candidate, which corresponds to the bridge tail state linked to the bridge transition. In this way, matching an appropriate input key on the characteristic DFA can reach its final state (the bridge head state), and the target candidate can be obtained by the corresponding bridge tail state and performing the subsequent state transitions. For example, the string of Chinese characters "呼哺呼哺优惠券" and the corresponding DFA (given by Regular Expression (2)) are linked together by a bridge transition '\t', which may be expressed by Regular Expression (4). When linked with the corresponding characteristic DFA, the string of Chinese characters is regarded as a linear DFA. Preferably, the final state of the characteristic DFA is prior to the initial state of the target candidate in DFA form, as shown in Regular Expression (4). The characteristic DFA of the target candidate and the target candidate in DFA form which are linked together by the bridge transition '\t' is also a DFA.

In step 310, the linked target candidate and its characteristic DFA is added into a database DFA, such that the final state of the characteristic DFA is corresponding to a bridge head state of the database DFA and the initial state of the target candidate is corresponding to the bridge tail state.

For example, by applying DFA union operations on the bridge linked DFAs of all target candidates (use any union strategy, such as one union-all operation or recursive two-two union operations, etc.), the database DFA can be created.

However, the above algorithm for generating the database DFA may be too slow and occupy too much memory. To address this problem, the following steps may be used to create the database DFA in step 310.

First, the linked target candidate and its characteristic DFA obtained in step 308 is reversed. After the reversing operation, the DFA expressed by Regular Expression (4) is exemplarily given by Regular Expression (5) below.

$$券惠优哺呼哺呼 \text{\textbackslash}t(naux|nauq)(iuh)(uoy)(uflup)(aij|aix)(uflup)(aij|aix) \quad (5)$$

It should be noted that, as each Chinese character is a multi-byte data and the reversing to the Chinese characters may create disorderly codes in a computer system, the Chinese characters in Regular Expression (5) are merely used to facilitate understanding of the present application. The first portion of Regular Expression (5) "券惠优哺呼哺呼" which is prior to the bridge transition "\t" is called the prefix (the prefix is a plain string), and the second portion of Regular Expression (5) "(naux|nauq)(iuh)(uoy)(uflup)(aij|aix)(uflup)(aij|aix)" is called the suffix (the suffix is a general DFA).

Next, the prefix "券惠优哺呼哺呼" of Regular Expression (5) is added into an intermediate database DFA by a DFA-plain-string-insertion algorithm (during the process new states may or may not be created), and after this, the final state of the prefix may correspond to a state BH (Bridge- Head, may be a newly created state or an existing state) in the intermediate database DFA. Then create a new bridge transition "\t" on BH, and link it to the initial state (the BridgeTail state) of the suffix DFA (DFA for "(naux|nauq)(iuh)(uoy)(uf|up)(aij|aix)(uf|up)(aij|aix)"). Then perform an incremental equivalent state elimination algorithm: removing and merging equivalent states in reverse topological order (just reverse topological sort on the suffix DFA and follow reverse link of the prefix+' \t').

With the above algorithm for generating the intermediate database DFA, many sub DFAs may share common prefixes and common suffixes, so as to minimize the size of the intermediate database DFA. The minimized intermediate database DFA can significantly reduce the memory usage and make physically impossible works (build databases for large target candidate sets) being possible.

Figure 5:
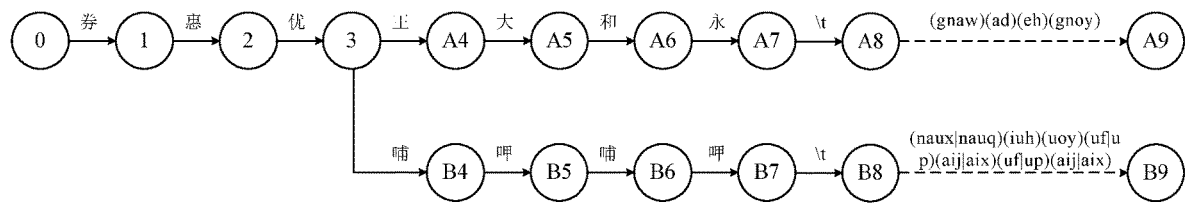
FIG. 5 shows an example of adding Chinese characters "券惠优哺呷哺呷" into an intermediate database DFA.

FIG. 5 shows an example of adding a reversed string of Chinese characters "券惠优　哺呷哺呷" with its characteristic DFA into an intermediate database DFA.

As shown in FIG. 5, assume that the original intermediate database DFA has a DFA " 券惠优哺呷哺呷 " (reversed version of " 永和大十优惠券 "), but does not have a DFA " 券惠优哺呷 " or the like. When adding the Chinese characters " 券惠优哺呷哺呷 " and its characteristic DFA linked therewith, a prefix " 券惠优哺呷哺呷 " is added first. As states corresponding to " 券惠优 " already exist in the intermediate database DFA, it is only required to create new states (B4, B5, B6 and B7) and link the state B7 to a state B8 with a bridge transition "\t". As the characteristic DFA is intermediately subsequent to the bridge transition "\t", the state B8 is also the initial state of the characteristic DFA. The state B8 transits to a state B9 which is the final state of the characteristic DFA through various states of the characteristic DFA (not shown). Next, from the state B9, the states equivalent to the existing states in the intermediate database DFA of the states B1 to B9 can be deleted, so as to minimize the size of the intermediate database DFA.

After all the reversed DFA have been added into the intermediate database DFA, the intermediate database DFA can be further reversed to obtain the database DFA. The reversing on the intermediate database DFA causes that the reversed target candidates and their characteristic DFAs restored to themselves, as shown in Regular Expression (4).

In this way, the desired minimized database DFA is obtained (There is a theorem: Reversing a DFA by power set construction algorithm produces the minimized reverse DFA).

When searching an input key (by its characteristic DFA) for target candidates in the database DFA using DFA intersection algorithm, it is equivalent to parallel searching all combinations of pinyins of the input key on all characteristic DFAs of all target candidates. In this way, the bridge head states are directly obtained by the DFA intersection algorithm, then the corresponding bridge tail states are used as roots to enumerate the strings (right language). Thus, the corresponding target candidates are obtained (each enumerated string is a target candidate), which are the desired suggestion candidates.

Figure 6:
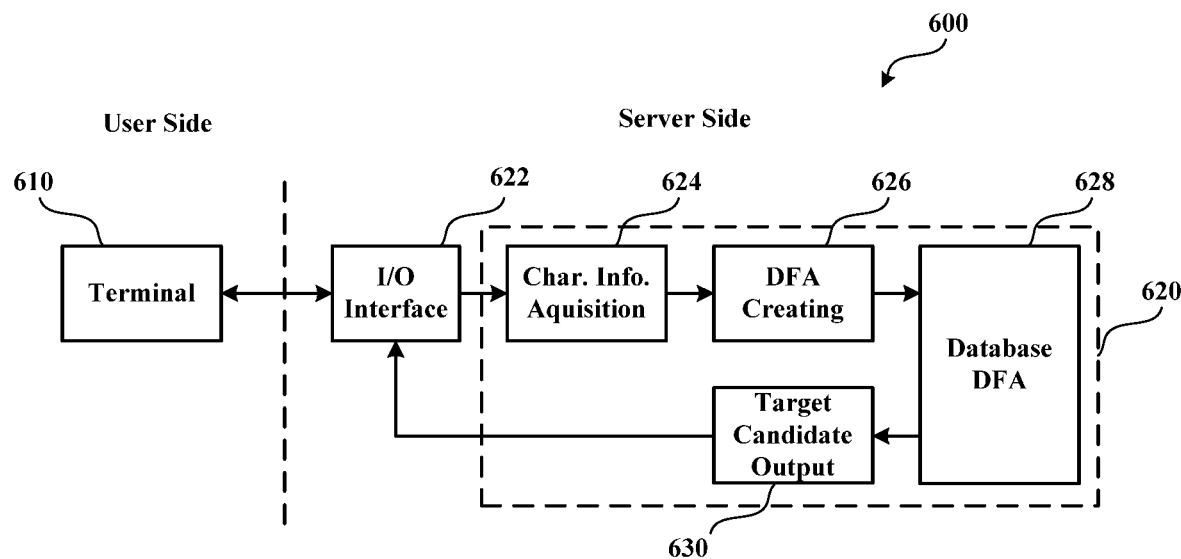
FIG. 6 shows a computer system 600 according to an embodiment of the present application.

FIG. 6 shows a computer system 600 according to an embodiment of the present application. The computer system 600 includes an apparatus 620 for providing search suggestion candidates.

As shown in FIG. 6, the computer system 600 includes a terminal 610 and the apparatus 620 for providing search suggestion candidates, which may be in communication with each other via a network (either wireless or wired) for data interaction. The apparatus 620 may be disposed at a server side, functioning as a network server for providing data processing service for the terminal 610 at a terminal side. The terminal may be a device with data input/output capability and data processing capability, such as a mobile terminal, a PC, a router, a wireless communication device or another server.

The apparatus 620 is linked to the network via an input/output interface 622, so as to transmit data to and received data from the terminal 610, for example, receive input keys from the terminal 610 and transmit target candidates to the terminal 610.

Specifically, the apparatus 620 includes an acquisition unit 624 for acquiring characteristic information of an input key; a DFA creating unit 626 for creating a characteristic DFA of the input key based on the characteristic information of the input key; a searching unit (not shown) for searching the characteristic DFA of the input key in a predetermined database DFA 628 having a plurality of bridge transitions each linking a bridge head state with a bridge tail state, so as to identify a bridge head state that matches the characteristic DFA of the input key, wherein each bridge tail state of the predetermined database DFA 628 corresponds to one or more target candidates and each bridge head state corresponds to a final state of a characteristic DFA of the target candidate which is created based on characteristic information of the target candidate; and an output unit 630 for outputting one or more target candidates corresponding to a bridge tail state linked with the identified bridge head state as search suggestion candidate(s) for the input key. In the embodiment shown in FIG. 6, the database DFA 628 is integrated within the apparatus 620. It can be readily appreciated that, the server may be any type of servers or computer devices that can implement the server function. Besides the apparatus 620, the server may include any other modules such as a data storage device for storing data. The data storage device may be a hard disk, a tape memory, a RAM/ROM memory or a FLASH memory. In an embodiment, the data storage device may store intermediate results or final results obtained by the server processing data.

It should be noted that, in certain embodiments, the apparatus for providing search suggestion candidates for an input key may be alternatively integrated within the terminal such as a PC or a mobile terminal. Accordingly, the database DFA may be integrated within the terminal or deployed at the server side. The specific structure and implementation of such embodiments can be appreciated by people skilled in the art, which will not be elaborated herein.

Figure 7:
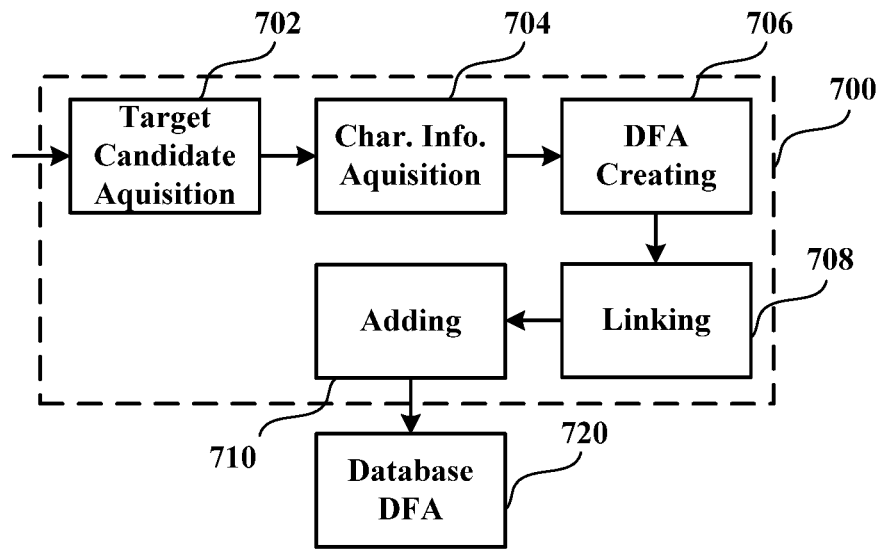
FIG. 7 shows an apparatus 700 for creating a database DFA according to an embodiment of the present application.

FIG. 7 shows an apparatus 700 for creating a database DFA according to an embodiment of the present application. The database DFA has a plurality of bridge transitions each linking a bridge head state and a bridge tail state, and the bridge head states can be used for comparison with external DFAs.

As shown in FIG. 7, the apparatus 700 includes a data acquisition unit 702 for acquiring a target candidate; an information acquisition unit 704 for acquiring characteristic information of the target candidate; a creating unit 706 for creating a characteristic DFA of the target candidate based on the characteristic information of the target candidate; a linking unit 708 for linking a final state of the characteristic DFA of the target candidate with the target candidate by a bridge transition of the plurality of bridge transitions; and an adding unit 710 for adding the linked target candidate and its characteristic DFA into the database DFA. A final state of the characteristic DFA of the target candidate is corresponding to a bridge head state of the database DFA. In the embodiment shown in FIG. 7, the linking unit 708 and the adding unit 710 are shown as two separate units, and in some alternative embodiment, the linking unit and the adding unit may be combined to a single unit.

Figure 8:
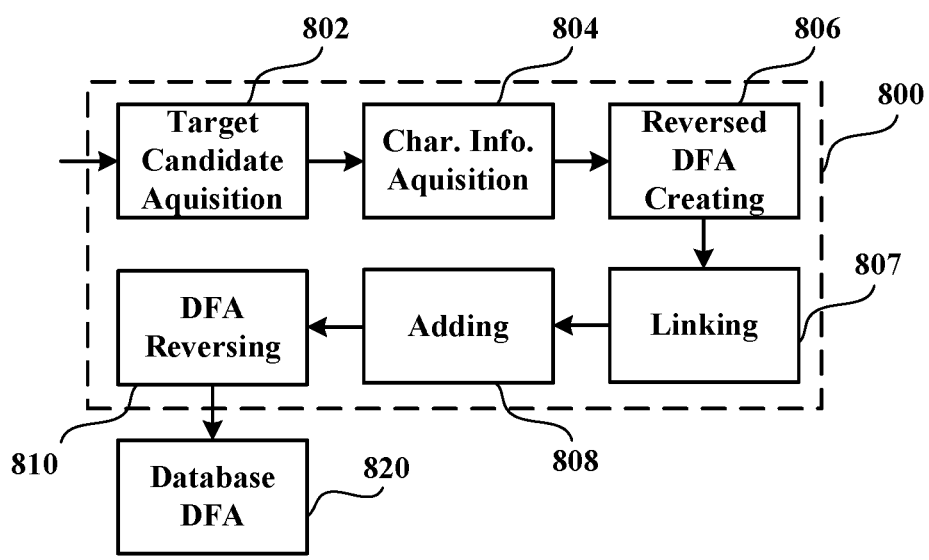
FIG. 8 shows an apparatus 800 for creating a database DFA according to another embodiment of the present application.

FIG. 8 shows an improved apparatus 800 for creating a database DFA according to an embodiment of the present application. The database DFA has a plurality of bridge transitions each linking a bridge head state and a bridge tail state, and the bridge head states can be used for comparison with external DFAs As shown in FIG. 8, the apparatus 800 includes a data acquisition unit 802 for acquiring a target candidate; an information acquisition unit 804 for acquiring characteristic information of a target candidate; a creating unit 806 for creating a reversed characteristic DFA of the target candidate based on the characteristic information of the target candidate; a linking unit 807 for linking the final state of the reversed target candidate (in DFA form) with the initial state of the reversed characteristic DFA of the target candidate by a bridge transition of the plurality of bridge transitions; an adding unit 808 for incrementally adding the bridge-linked reversed target candidate and its reversed characteristic DFA into an intermediate database DFA; and a DFA reversing unit 810 for reversing the intermediate database DFA to obtain the database DFA as the final output of the apparatus 800.

The operation of the embodiments shown in FIGS. 6, 7 and 8 may be referred to the embodiments shown in FIGS. 1 and 3, which will not be elaborated herein.

It should be noted that the structure of the embodiments shown in FIGS. 6, 7 and 8 are exemplary only, and not a limitation to the present application. In some cases, certain modules can be added into or deleted from the embodiments shown in FIGS. 6, 7 and 8.

In some embodiments of the present application, some computer program products are provided, which have non-transitory computer readable storage medium including instructions for performing the steps of the embodiments shown in FIGS. 1 and 3. In some embodiments, the computer program product may be stored in the system or apparatus shown in FIG. 6, 7, 8.

The embodiments of the present application may be implemented by hardware, software or any combination thereof. The hardware may be implemented by specific logic circuits, and the software may be stored in a memory and executed by appropriate instruction executing systems. For example, the software may be executed by a microprocessor or a specifically designed hardware. Those skilled in the art may understand that the previous apparatus and method of the present application may be implemented by computer-executable instructions and/or control codes contained in the processor. For example, such codes may be provided in storage mediums such as hard disks, CD(s), DVD-ROM(s), programmable memories such as ROM(s), or data mediums such as optical or electrical signal mediums. An apparatus of the present application and its modules may be implemented by hardware circuits including VLSI(s) or gate arrays, semiconductor circuits such as logic circuits or transistors, or programmable hardware devices such as FPGA(s) or PLD(s). An apparatus of the present application may also be implemented by software executable by various processors, or implemented by the combinations of the hardware and software such as firmware.

It should be noted that, although several modules or sub-modules of the apparatus have been described in the previous paragraphs, such division is not mandatory. The functions and features of two or more modules described above may be embodied in a module. Otherwise, the function and feature of one module described above may be embodied in two or more modules.

Furthermore, although the operation of a method according to the present application is illustrated with reference to the accompanying drawings in a specific sequence, the present application may be practiced using process flows that differ from that illustrated. Additionally, it should be noted that not all steps are required in every embodiment. In other words, one or more of the steps may be omitted or replaced, without departing from the spirit and scope of the invention. In certain embodiments, steps may be performed in different order, in parallel with one another, or omitted entirely, and/or certain additional steps may be performed without departing from the scope of the present application. In the claims, the word "comprising" does not exclude other elements or steps, and the indefinite article "a" or "an" does not exclude a plurality. A single processor or other unit may fulfill the functions of several items recited in the claims. The reference signs in the claims should not be construed as limiting the scope. The scope and spirit of the application is defined by the appended claims.

What is claimed is:

1. A method for providing one or more search suggestion candidates for an input key, comprising:
   (1) acquiring characteristic information of the input key;
   (2) creating a characteristic DFA (Deterministic Finite Automaton) of the input key based on the characteristic information of the input key;
   (3) searching the characteristic DFA of the input key in a predetermined database DFA having a plurality of bridge transitions each linking a bridge head state with a bridge tail state, so as to identify a bridge head state that matches the characteristic DFA of the input key, wherein each bridge head state of the predetermined database DFA corresponds to a final state of a characteristic DFA of a target candidate which is created based on characteristic information of the target candidate; and
   (4) outputting one or more target candidates corresponding to a bridge tail state linked with the identified bridge head state as the one or more search suggestion candidates for the input key.

2. The method of claim 1, wherein the characteristic information of the input key is obtained from a predefined characteristic information database, and wherein step (1) further comprises:
   creating the predefined characteristic information database, said predefined characteristic information database storing data items and respective characteristic information associated with said data items;
   determining the characteristic information of all data items of the input key based on the predefined characteristic information database.

3. The method of claim 1, wherein step (2) further comprises:
   creating one or more characteristic sub-DFAs for respective data items of the input key, based on the characteristic information of the respective data items of the input key;
   linking the one or more characteristic sub-DFAs to obtain a characteristic NFA (Non-deterministic Finite Automaton) corresponding to the input key; and
   converting the characteristic NFA into the characteristic DFA.

4. The method of claim 1, wherein the predetermined database DFA is created by:
   (A) acquiring the target candidate;

(B) acquiring characteristic information of the target candidate;

(C) creating a characteristic DFA of the target candidate based on the characteristic information of the target candidate;

(D) linking a final state of the characteristic DFA of the target candidate with the target candidate by a bridge transition of the plurality of bridge transitions; and (E) adding the target candidate and the characteristic DFA of the target candidate which are linked with each other into the predetermined database DFA, such that a final state of the characteristic DFA of the target candidate is corresponding to a bridge head state of the predetermined database DFA.

5. The method of claim 4, wherein the target candidate is stored in DFA form, and the final state of the characteristic DFA of the target candidate is linked with an initial state of the target candidate in DFA form by the bridge transition.

6. The method of claim 4, wherein step (E) further comprises:
adding the target candidate and the characteristic DFA of the target candidate which are linked with each other into the predetermined database DFA incrementally.

7. The method of claim 4, wherein step (E) further comprises:
reversing the target candidate and the characteristic DFA of the target candidate which are linked with each other;
adding the target candidate and the characteristic DFA of the target candidate which are linked with each other and further reversed into an intermediate database DFA in reverse topological order; and
reversing the intermediate database DFA to obtain the predetermined database DFA, wherein a final state of a characteristic DFA of each target candidate is prior to an initial state of the target candidate in DFA form linked therewith.

8. The method of claim 1, further comprising:
receiving a user selection input;
selecting a search suggestion candidate according to the user selection input.

9. The method of claim 1, wherein the method is used for user-input error correction, wherein
both of the input key and the target candidate comprise a string of Chinese characters, and
the characteristic information of the input key comprises pinyins, foreign language corresponding words, or stem components of said string of Chinese characters.

10. The method of claim 1, wherein the method is used for Chinese text input method, wherein
the input key comprises a string of pinyin characters,
the characteristic information of the input key comprises characteristic pinyin information, and
the target candidate comprises Chinese characters.

11. The method of claim 1, wherein the method is used for language translation, wherein
the input key comprises a text string of a first language,
the characteristic information of the input key comprises characteristic information of the first language, and
the target candidate comprises a text string of a second language.

12. The method of claim 1, wherein the method is used for voice recognition, wherein
the input key comprises voice input,
the characteristic information of the input key comprises vocal characteristic of the voice input, and
the target candidate comprises text.

13. A method for creating a database DFA (Deterministic Finite Automaton), wherein the database DFA has a plurality of bridge transitions each linking a bridge head state and a bridge tail state, and the method comprises:
(A) acquiring a target candidate;
(B) acquiring characteristic information of the target candidate;
(C) creating a characteristic DFA of the target candidate based on the characteristic information of the target candidate;
(D) linking a final state of the characteristic DFA of the target candidate with the target candidate by a bridge transition of the plurality of bridge transitions; and
(E) adding the target candidate and the characteristic DFA of the target candidate into the database DFA, such that the final state of the characteristic DFA is corresponding to a bridge head state of the database DFA.

14. The method of claim 13, wherein step (B) further comprises:
creating a predefined characteristic information database, said predetermined characteristic information database storing data items and respective characteristic information associated with said data items; and
determining the characteristic information of all data items of the target candidate based on the predefined characteristic information database.

15. The method of claim 13, wherein step (C) further comprises:
creating one or more characteristic sub-DFA for respective data items of the target candidate, based on the characteristic information of the respective data items of the target candidate;
linking the one or more characteristic sub-DFAs to obtain a characteristic NFA corresponding to the target candidate; and
converting the characteristic NFA into the characteristic DFA.

16. The method of claim 15, wherein the target candidate is stored in DFA form, and the final state of the characteristic DFA of the target candidate is linked with an initial state of the target candidate in DFA form by the bridge transition, and the initial state of the target candidate corresponds to a bridge tail state.

17. The method of claim 13, wherein step (E) further comprises:
reversing the target candidate and the characteristic DFA of the target candidate which are linked with each other;
adding the target candidate and the characteristic DFA of the target candidate which are linked with each other and further reversed into an intermediate database DFA in reverse topological order; and
reversing the intermediate database DFA to obtain the database DFA, wherein a final state of a characteristic DFA of each target candidate is prior to the initial state of a target candidate in DFA form linked therewith.

18. The method of claim 13, wherein the database DFA is used for user-input error correction, and wherein
the target candidate comprises a string of Chinese characters, and
the characteristic information of the target candidate comprises pinyin information, foreign language corresponding words, or stem components of said string of Chinese characters.

19. The method of claim 13, wherein the database DFA is used for Chinese text input method, and wherein
the target candidate comprises Chinese characters, and the characteristic information of the target candidate comprises characteristic pinyin information of the Chinese characters.

20. The method of claim 13, wherein the database DFA is used for language translation, and wherein the target candidate comprises a text string of first language.

21. The method of claim 13, wherein the database DFA is used for voice recognition, and wherein the target candidate comprises text, and the characteristic information of the target candidate comprises vocal characteristic of the text.

22. A computer program product for providing one or more search suggestion candidates for an input key, wherein the computer program product comprising a non-transitory computer readable storage medium including instructions executable by a processor to cause the processor to perform:

(1) acquiring characteristic information of the input key;

(2) creating a characteristic DFA (Deterministic Finite Automaton) of the input key based on the characteristic information of the input key;

(3) searching the characteristic DFA of the input key in a predetermined database DFA having a plurality of bridge transitions each linking a bridge head state with a bridge tail state, so as to identify a bridge head state that matches the characteristic DFA of the input key, wherein each bridge head state of the predetermined database DFA corresponds to a final state of a characteristic DFA of a target candidate which is created based on characteristic information of the target candidate; and (4) outputting one or more target candidates corresponding to a bridge tail state linked with the identified bridge head state as the one or more search suggestion candidate for the input key.

23. A computer program product for creating a database DFA (Deterministic Finite Automaton) having a plurality of bridge transitions each linking a bridge head state and a bridge tail state, wherein the computer program product comprising a non-transitory computer readable storage medium including instructions for performing:

(A) acquiring a target candidate;

(B) acquiring characteristic information of the target candidate;

(C) creating a characteristic DFA of the target candidate based on the characteristic information of the target candidate;

(D) linking a final state of the characteristic DFA of the target candidate with the target candidate by a bridge transition of the plurality of bridge transitions; and (E) adding the target candidate and the characteristic DFA of the target candidate which are linked with each other into the database DFA, such that the final state of the characteristic DFA is corresponding to a bridge head state of the database DFA.

* * * * *